Figure 1:
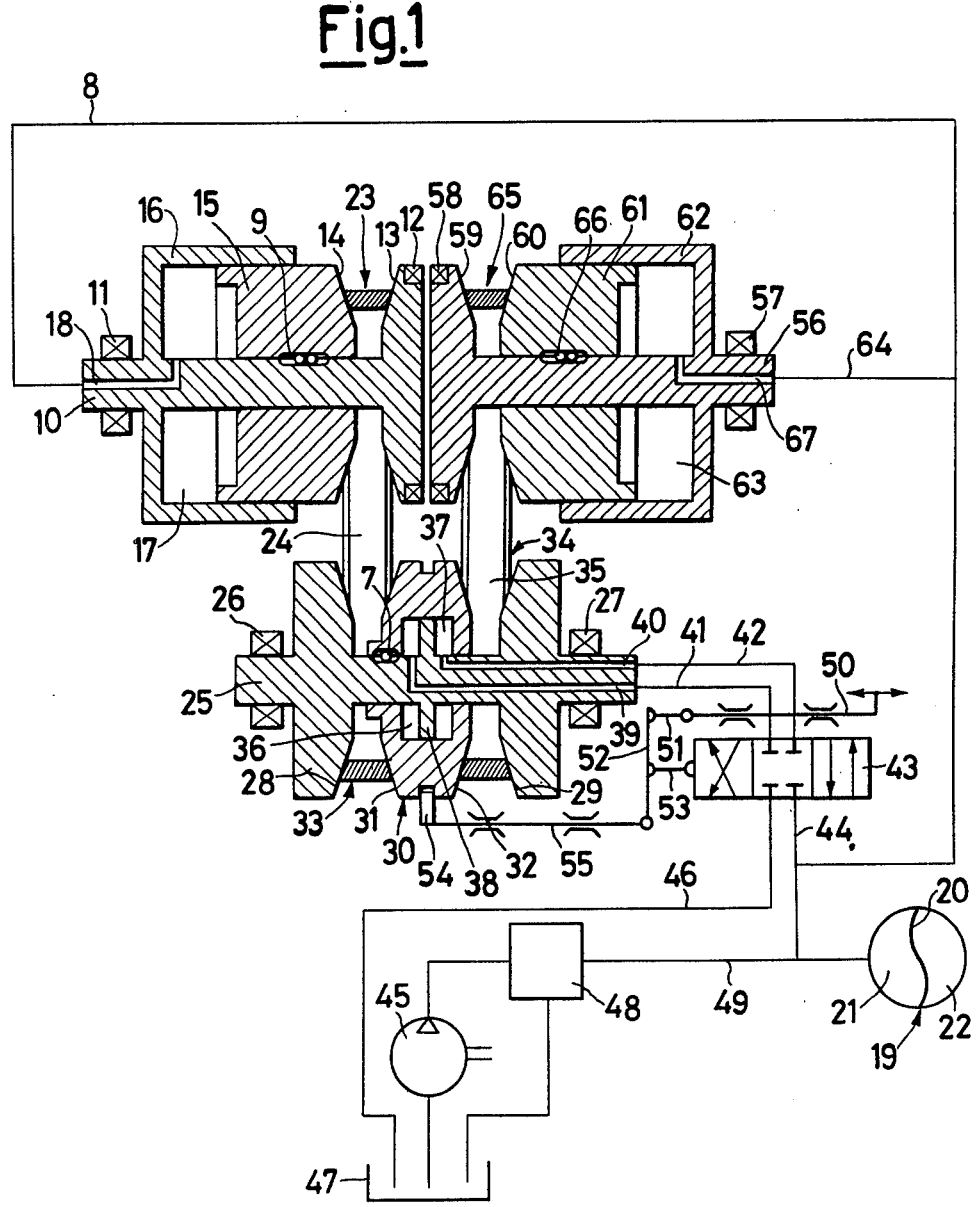

United States Patent [19]

Toti et al.

[11] Patent Number: 4,484,901
[45] Date of Patent: Nov. 27, 1984

[54] AUTOMATIC SPEED VARIATOR FOR MOTOR VEHICLES

[75] Inventors: Gabriele Toti; Carlo Guatta, both of Milan; Luciano Chidini, Arese; Luciano Longhi, Busto Arsizio, all of Italy

[73] Assignee: Alfa Romeo S.p.A., Milan, Italy

[21] Appl. No.: 341,289

[22] Filed: Jan. 21, 1982

[30] Foreign Application Priority Data

Feb. 6, 1981 [IT] Italy .................. 19579 A/81

[51] Int. Cl.³ .............. F16H 55/52; F16H 7/08; G01F 3/24
[52] U.S. Cl. .................... 474/28; 474/32; 474/88; 474/89
[58] Field of Search .............. 474/28, 18, 32, 88, 474/89

[56] References Cited

U.S. PATENT DOCUMENTS

| | | |
|---|---|---|
| 3,044,316 | 7/1962 | Forster .................. 474/28 |
| 3,081,642 | 3/1963 | Emerson ................ 474/28 |
| 3,152,490 | 10/1964 | Lemieux ............... 474/28 |
| 3,425,288 | 2/1969 | Golden et al. ......... 474/28 |
| 3,782,213 | 1/1974 | Rattunde ............... 474/28 |
| 3,893,344 | 7/1975 | Dantlgrabber et al. . 474/28 |
| 4,116,080 | 9/1978 | Berens .................. 474/28 |
| 4,136,581 | 1/1979 | Winter et al. .......... 474/32 |
| 4,143,558 | 3/1979 | van Deursen et al. .. 474/28 |
| 4,173,156 | 11/1979 | Horowitz et al. ...... 474/18 |
| 4,229,988 | 10/1980 | Rattunde ............... 474/28 |
| 4,292,031 | 9/1981 | Rattunde ............... 474/28 |
| 4,369,675 | 1/1983 | van Deursen .......... 474/18 |
| 4,387,608 | 6/1983 | Mohl et al. ............ 474/18 |
| 4,403,974 | 9/1983 | Shermann et al. ..... 474/28 |

FOREIGN PATENT DOCUMENTS

| | | | |
|---|---|---|---|
| 648493 | 2/1936 | Fed. Rep. of Germany | 474/32 |
| 2652938 | 5/1978 | Fed. Rep. of Germany | 474/28 |
| 1115095 | 4/1956 | France | 474/32 |

Primary Examiner—Lawrence J. Staab
Assistant Examiner—Michael D. Bednarek
Attorney, Agent, or Firm—Charles E. Brown

[57] ABSTRACT

A speed variator for cars of the kind essentially comprising a variable-pitch-circle sheave and a belt and a driven sheave is improved by the provision of two driving half-sheaves which, with their respective driven half-sheaves, and the two belts compose the mechanical part of the variator. Hydraulic or mechanical provide necessary counteracting forces and are controlled by detectors and a transducing system so that the pitch circle diameters of the driving and the driven sheave can be controlled consistently with the variations of any preselected operative parameter of the engine or another part of the vehicle concerned.

5 Claims, 3 Drawing Figures

AUTOMATIC SPEED VARIATOR FOR MOTOR VEHICLES

This invention relates to an automatic speed variator of the kind with a belt and sheaves having a variable pitch diameter, particularly suitable for motor vehicles having an internal combustion engine, inasmuch as it is versatile, it can automatically be actuated with a reduced power, it is very reliable and reasonably compact.

The automatic speed variators of this class generally comprise a driving sheave to be connected to the engine, a driven sheave connected to the secondary shaft, or directly to a motive wheel of the motor vehicle, and a belt which mutually connects both sheaves. Each sheave consists of two confronting frustoconical half-sheaves, either of which is keyed to the respective shaft, whereas the other sheave, even being rotatable about the same shaft, can be driven by a pressurized fluid loop as a function of the operative parameters of the engine and the car, so as to slide axially along said shaft, thus causing radial shifts of the belt wrapping both the driving and driven sheave, and bringing about the variations of the pitch diameter which originate the variations of the transmission-ratio between the two sheaves.

These automatic speed variators have the advantage of a comparatively simple structure and are reliable, but they involve certain limitations: for example, they do not allow that the range of variation of the obtainable transmission ratios may be expanded beyond certain limits because it is not advisable to reduce under certain limits the pitch diameters of the sheaves in order that unacceptable bending fatigue stresses may not be induced in the belts.

In addition, while these variators appear to be easily applicable to motor vehicles having certain types of propulsion, such as the engines with front traction, especially if the engine is arranged transversally of the vehicle axis, or with independent traction on the two motive wheels, they, however, give rise to installation problems with other kinds of propulsion, such as front engine and rear traction, the engine being installed longitudinally.

An object of the present invention is to provide an automatic speed variator of the kind having a belt and sheaves with a variable pitch diameter, which is capable of overcoming the limitations inherent in the conventional variators of the kind referred to above.

The speed variator envisaged by the present applicants consists of sheaves interconnected by belt means, embodied by two confrontingly mounted frustoconical half-sheaves, either of which is integral with the respective shaft, whereas the other is both rotatable about said shaft and slidable axially thereover, the axially slidable half-sheave of at least either of said sheaves having integral therewith an actuator capable of positioning it axially, said actuator being operatively connected to control means energized by detectors of preselected operative parameters of the engine and the car for governing the axial shifts of said half-sheave, the axially slidable half-sheave of at least either of said sheaves engaging means capable of imparting a tension to said belt means, the variator in question being characterized in that it comprises a main driving sheave connectable to the shaft of the internal combustion engine, a main driven sheave connected to the transmission shaft of the motor vehicle, at least one couple of drive-transfer sheaves, one of the driven kind and the other of the driving kind, the transfer driven sheave being interconnected by first belt means to the main driving sheave and the transfer driving sheave being interconnected by second belt means to the main driven sheave, the axially slidable half-sheaves of the drive-transfer sheaves being mutually interlinked.

According to a preferred approach, said axially slidable half-sheaves of the drive-transfer sheaves have an actuator common to both, of the kind with variable-volume chambers and are interlinked by means of a common cylindrical body the inner space whereof is partitioned into two variable-volume chambers by a separatory wall integral with the fixed half-sheaves of the drive-transfer sheaves themselves, said variable-volume chambers being connected to a pressurized-oil circuitry via valve means controlled by the detectors aforementioned to control the intake and the outlet of oil into and from said chambers.

According to another preferred embodiment the axially slidable half-sheaves of said main sheaves engage means capable of inducing a tensional force into the belt means, the formed means being operatively interconnected and mutually interacting so as to assists the coherent shifts of the same half-sheaves: more particularly the axially slidable half-sheaves of said main sheaves engage means capable of tensioning the belt means, said tensioning means consisting of a cylinder and a piston which provide two variable-volume chambers connected to a pressurized oil circuitry and to a common pressure accumulator.

An automatic speed variator so conceived provides a full range of variation of the transmission ratios, said range being expressed by the product of the values of the two partial variation ranges which can be obtained with the single pair of driving and driven sheaves; it becomes thus possible to obtain an overall range of variability of the ratios, which is well wider than the one which would be available in any conventional speed variator, with a single couple of driving and driven sheaves, even adopting for the single couple of sheaves a range of variability of the ratios which is narrower than that afforded by a couple of sheaves of any conventional speed variator.

The advantage stemming therefrom, over the conventional speed variators, is a narrower variations of the pitch diameters of the sheaves of the single sheave couple so that the fatigue stresses for the belts are consequentially reduced.

Another advantage afforded by the speed variator described herein is the fact that the output shaft of the speed variator, to which the main driven sheave is keyed, can also be arranged coaxially with the input shaft of the mechanism, to which the main driving sheave is secured, so that the transmission shaft becomes aligned with the engine shaft. This arrangement is definitely an asset when arranging the transmission in the case of a front engine and rear traction, the engine being arranged longitudinally of the vehicle axis.

Still another advantage of the speed variator suggested herein is that it can be actuated with comparatively small thrust forces such as can be obtained when the size of the actuators is comparatively small, and the required power is a minimum: as a matter of fact axial mutually counteracting forces deriving from the belt pulls are active upon the single block consisting of the two axially slidable drive-transfer half-sheaves, so that it is only necessary, to bring about an axial displacement of such a block, that the difference between said two forces be overcome. Under limiting conditions, of course, the force to be overcome is zero if the two mutually contrasting forces are of equal magnitude just because the resilient (or hydraulic) means which produce such forces are mutually interlinked. A similar reduction, or annulment, of the actuating work is obtained also in the case in which the actuator is connected to the slidable half-sheave of either main sheave.

Features and advantages of the invention will be illustrated in more detail with the aid of the FIGS. from 1 to 3 of the accompanying drawings, wherein preferred embodiments of the speed variator according to the invention are shown by way of example only and without limitation.

In FIG. 1, the numeral 10 indicates the input shaft of the speed variator, said shaft being connectable to the main shaft of the engine (not shown) by a friction clutch or a hydraulic joint (neither is shown). The shaft 10 is supported for rotation by the bearings 11 and 12 and carries integrally the frustoconical half-sheave 13. To the same shaft 10 is secured, integral with it in rotation, but axially slidable thereon via the connection 9 by spheres, the frustoconical half-sheave 14, to which is integrally connected a piston indicated at 15, which is inserted in the inner space of a cylinder 16, the latter being also integral with the shaft 10. Obviously, either the half-sheave 13, or the cylinder 16 must be secured to the shaft 10 by a dismemberable connection: this has not been illustrated to simplify the showing.

The variable-volume chamber 17 confined between the cylinder 16 and the piston 15 is filled with oil under pressure and is connected via the conduit 18 and the line 8 to an accumulator 19 consisting of the two discrete chambers divided by the diaphragm 20: one chamber is filled with oil and is indicated at 21, the other is filled with a compressed gas and is indicated at 22 to keep the oil under pressure.

About the sheave consisting of the two half-sheaves 13 and 14, and generally indicated at 23, a belt, indicated at 24, is wrapped.

In the drawing, 25 indicates a drive-transfer shaft which is supported for rotation by the bearing 26 and 27 and integrally carries the frustoconical half-sheaves 28 and 29. Shaft 25 also supports the block generally indicated at 30 and formed by the two frustoconical half-sheaves 31 and 32; the block 30 is mounted on the shaft 25 and rotates therewith but it axially slides thereon via the ball connection 7: it could be idly mounted, however. The half-sheaves 28 and 31 compose the sheave 33 on which the belt 24 is wrapped and the half-sheaves 29 and 32 compose the sheave 34 on which the belt 35 is wrapped. The two half-sheaves 31 and 32 are hollowed-out internally and, upon assemblage, they provide an internal cylindrical space which is split into two variable-volume chambers 36 and 37 by the separatory wall 38 integral with the shaft 25. There are shown at 39 and 40 two conduits formed through the shaft 25 for establishing a communication between the chambers 36 and 37, via the lines 41 and 42, and to the slidable distributor 43, via the line 44 which is connected to the accumulator 19 and with the feedback line 46 to the oil reservoir 47. At 45 a pump is shown which feeds the accumulator 19 via a pressure-regulator valve 48 and the line 49.

The positioning of the shutter of the distributor 43 is controlled, via the slidable rod 50, the bar 51, the lever 52 and the rod 53, by detectors (known per se and thus not shown), of preselected operative parameters of the engine and the car (engine torque, engine rpm, position of the throttle, negative pressure at intake, engaged transmission ratio).

In the present case there is adopted as the feedback element for the shutter of the distributor 43 a detector 54 of the axial position of the block 30 and thus of the transmission ratio of the speed variator, the detector being connected to the slidable rod 55 and to the lever 52.

Lastly, in the drawing there is indicated at 56 the output shaft of the speed variator, to be connected to the transmission shaft (not shown); shaft 56 is supported for rotation by the bearings 57 and 58 and carries integrally the frustoconical half-sheave 59. Shaft 56 has also connected therewith for concurrent rotation but axially slidable via the ball connection 66, the frustoconical half-sheave 60 having, integral therewith a piston 61 introduced in the inner space of the cylinder 62, the latter being also integral with the shaft 56. The variable-volume chamber 63, confined by the cylinder 62 and the piston 61, is filled with oil under pressure and is connected via the duct 67 and the line 64 to the accumulator 19.

About the sheave composed by the two half-sheaves 59 and 60, which is generally indicated at 65, the belt 35 is wrapped.

In the chambers 17 and 63 it would also be possible to arrange springs as an alternative to the oil under pressure or also together with it: in addition each chamber 17 and 63 can be connected to an accumulator of its own.

In the speed variator described herein, the pull of the belt 24 is ensured by the action of oil under pressure which is present in the chamber 17 onto the piston 15 and, likewise, the pulls of the belt 35 is provided by the action of the oil under pressure which is present in the chamber 63 onto the piston 61. With sufficiently high oil pressure, such as obtainable with a highly compressed gas in the chamber 22 of the accumulator 19, the dimensions of the piston-cylinder units can be considerably be reduced. The characteristic of the accumulator can be so selected as to have on the belt a constant pull or a pull variable according to any preselected law of variation.

The variations of the transmission ratio are controlled by the displacement of the block 30 of the half-sheaves 31 and 32 towards the right (as viewed in the drawing) to reduce the transmission ratio and towards the left to increase it. In the former case, the shutter of the distributor 43 is controlled by detectors of preselected operative parameters of the engine and the car, to send oil under pressure into the chamber 36 and simultaneously to discharge oil out of the chamber 37: in the latter case, the shutter of the distributor 43 is controlled to carry out the reverse operations.

The axial thrusts exerted upon the belts 24 and 35 by the half-sheaves 31 and 32 when displaced axially, are converted into radial pushes onto the belts themselves, which, by being under pull and virtually unextensible, are shifted either upward or downward (in the drawing) and exert the half-sheaves 14 and 60 the axial thrust which produce the displacements of the half-sheaves themselves; this originates variations of the diameters of the pitch circles of the sheaves 23 33, 34 and 65 and thus to variations of the transmission ratios of the speed variator.

As the block 30 has carried out the desired axial shift, it takes a new equilibrium position, indifferent equilibrium, because the feedback linkage 54, 55 acts upon the lever 52 in the sense of closing the shutter of the distributor 43 so that the two chambers 36 and 37 are brought back to the pressure they had at the start.

Since the block 30 is virtually in an indifferent equilibrium and the pulls of the belts 24 and 35 are substantially the same and the resultant axial thrusts on the shaft 25 are at a minimum or do not exist at all, the thrusts which are necessary for carrying out the axial displacements of the block 30 are small and can be obtained, with a reduced oil pressure and with reduced dimensions of the half-sheaves 31 and 32, so that the actuation of the speed variator requires a minimum power expenditure.

Figure 2:
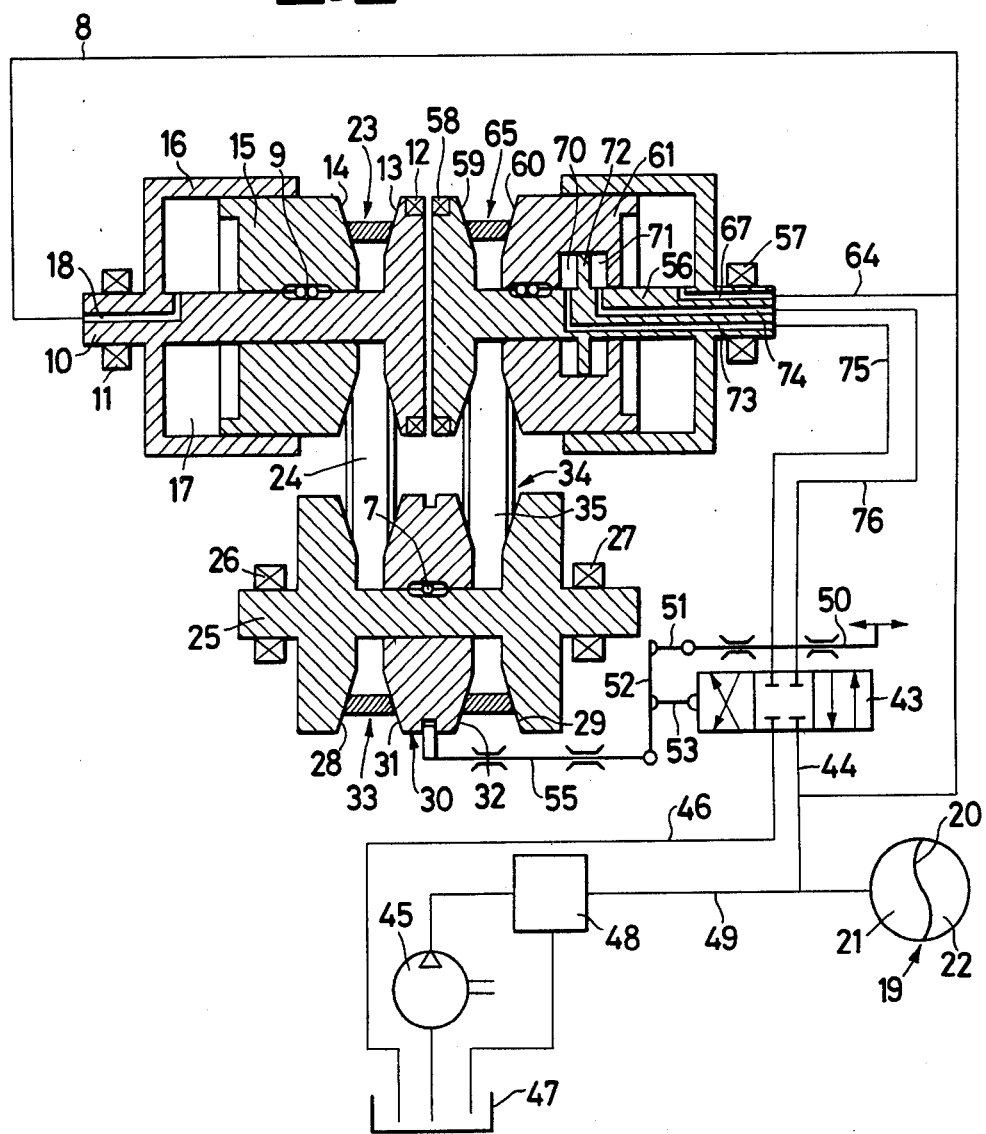

In FIG. 2, the same component parts shown in FIG. 1 have been indicated with the same reference numerals.

In this case, the block 30 of the half-sheaves 31 and 32 has no variable-volume chambers contrary to the previously described embodiment, whereas the piston 61 integral with the half-sheave 60 has the variable-volume chambers 70 and 71 partitioned by the wall 72 integral with the shaft 56. The chambers 70 and 71 are connected via the ducts 73 and 74 and the lines 75 and 76 to the slider distributor 43.

Now the variations of the transmission ratio are controlled by the half-sheave 60 which, with its rightward axial shifts causes a decrease of the transmission ratio, and, with its leftward axial shifts, originates an increase by the same amount. In the former case, the shutter of the distributor 43 is controlled by the detectors of the preselected operative parameters of the engine and the car to drive oil off the chamber 71 and to take oil into the chamber 70, whereas in the latter case it is controlled to feed with oil the chamber 71 and to have oil discharged from the chamber 70: with the displacements of the belts 24 and 35 either upwards and downwards and the resultant variations of the pitch circle diameters of the sheaves 23, 33, 34 and 65 the desired variations of the transmission ratios of the speed variator can be obtained.

Figure 3:
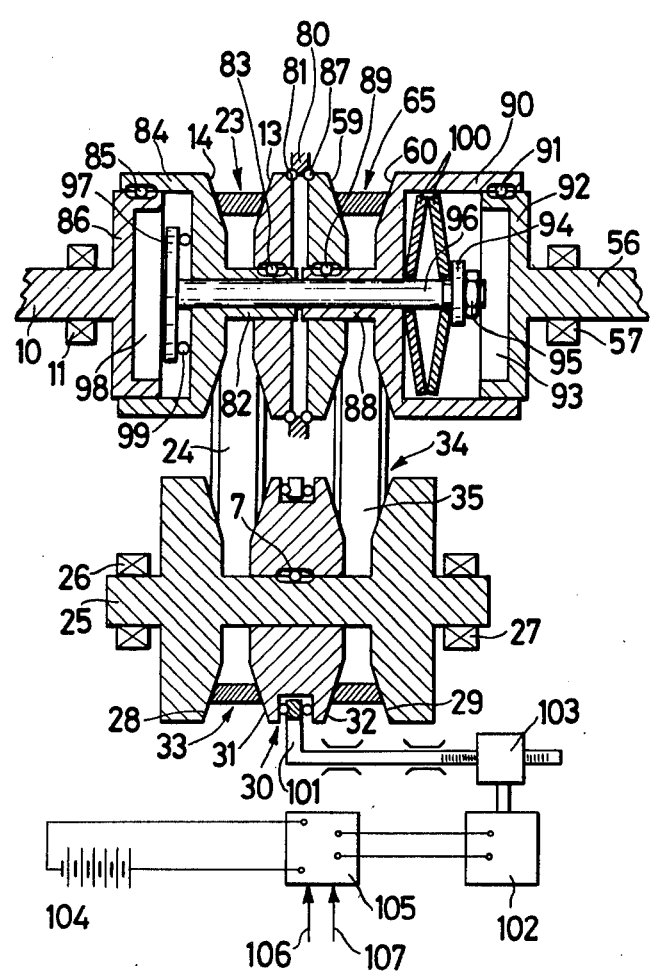

In the embodiment shown in FIG. 3 the half-sheave 13 of the main driving sheave 23 is supported in the gearbox 80 by the bearing 81 and is secured for rotation to the sleeve 82 of the half-sheave 14 by the ball connection 83. The half-sheave 14 has integral therewith the cylindrical body 84 which is secured for rotation, by the ball connection 85, to the piston 86 integral with the shaft 10. The half-sheave 59 of the main driven sheave 65 is also supported in the gearbox 80 by a bearing shown at 87 and is secured for rotation to the sleeve 88 of the half-sheave 60 by the ball gear 89. The half-sheave 60 has integral therewith the cylindrical body 90 which is secured for rotation, by the ball gear 91, to the piston 92 integral with the shaft 56.

Within the chamber 93, confined by the cylindrical body 90 and the piston 92, there are inserted two springs 100 of the Belleville type: these are retained under an appropriate preload by the clevis 96 through the washer 94 and the nut 95. The clevis 96 is passed through the sleeves 82 and 88 and is solid with the dish 97 which is inserted in the chamber 98 defined by the cylindrical body 84 and the piston 86 and is bound in the axial direction to the half-sheave 14 by the agency of the bearing 99.

The block 30 of the half-sheaves for drive-transfer is engaged by a fork shown at 101, which can be shifted along the direction of the axis of the block 30; by the electric motor 102 of the step-by-step class, with the intermediary of the combination rack-pinion 103. In the drawing, 104 indicates the storage battery which feeds the motor 102 and 105 indicates a device for governing the feeding current and which is adapted to modulate the current as a function of the requested displacements.

The regulation device 105 receives signals such as 106 and 107 as delivered by detectors of the operative parameters of the engine and the car, which control the actuation of the device 105.

The speed variator shown in FIG. 3 operates in the same manner as those shown in the previous FIGURES, but, in this case, provision is made so that the pull of the belts 24 and 35 is produced by the springs 100: these latter, through the dish 97 and the clevis 96, act upon the half-sheaves 60 and 14 to assist the axial shifts directed in the same direction, the result being that the sheaves 23 and 65 are in indifferent equilibrium.

In addition, the half-sheaves 31 and 32 which make up the block 30, are actuated by the electric motor 102 of the step-by-step type, which shifts them either rightwards or leftwards by a length which is a function of the commands delivered by the governing system 105 as a function of the signals such as 106 and 107 delivered by detectors of the operative parameters of the engine and the car.

We claim:

1. In a vehicle of the type including an engine and a drive shaft, an automatic speed variator comprising an input shaft, an output shaft and a transfer shaft, an input sheave carried by said input shaft and including a pair of opposed frustoconical first half-sheaves, one of said first half-sheaves being integrally connected to said input shaft and the other of said first half-sheaves being rotatable about and axially slidable on said input shaft, an input transfer sheave carried by said transfer shaft and including a pair of opposed frustoconical second half-sheaves, one of said second half-sheaves being integrally connected to said transfer shaft and the other of said second half-sheaves being rotatable about and axially slidable on said transfer shaft, an output transfer sheave carried by said transfer shaft and comprising a pair of opposed frustoconical third half-sheaves, one of said third half-sheaves being integrally connected to said transfer shaft and the other of said third half-sheaves being rotatable about and axially slidable on said transfer shaft, an output sheave carried by said output shaft and including a pair of opposed frustoconical fourth half-sheaves, one of said fourth half-sheaves being integrally connected to said output shaft and the other of said fourth half-sheaves being rotatable about and axially slidable on said output shaft, a first drive belt connecting said input transfer sheave to said input sheave and a second drive belt connecting said output sheave to said output transfer sheave, said axially slidable second and third half-sheaves being interconnected for movement as a unit, said engine being connectable to said input shaft and said drive shaft being connectable to said output shaft, detector means for detecting preselected operative parameters of the engine and the vehicle, control means connected to and energized by said detector means, an actuator operatively coupled to said control means for operation thereby, said actuator being coupled to at least one of said slidable first and fourth half-sheaves for axially positioning the same, and means interconnecting said slidable first and fourth half-sheaves for movement together in the same axial direction and in an opposite sense relative to the cooperating one first and fourth half-sheaves.

2. Speed variator according to claim 1, characterized in that said axially slidable second and third half-sheaves are equipped with an actuator common thereto and of the kind having variable-volume chambers interconnected via a common cylindrical body the internal space of which is partitioned into said two variable-volume chambers by a separation wall integrally connected to said transfer shaft, said variable-volume chambers being connected to a pressurized-oil circuitry via valve means controlled by said detector means for controlling the intake and the discharge of oil into and from said chambers.

3. Speed variator according to claim 1, characterized in that one of said axially slidable first and fourth half-sheaves has integral therewith a variable-volume chamber actuator comprising a cylindrical body the inner space whereof is partitioned into two variable-volume chambers by a separatory wall integral with the respective one of said input and output shafts, said variable-volume chambers being connected to a pressurized-oil circuitry via valve means controlled by said detector means for controlling the intake and the discharge of oil into and from said chambers.

4. Speed variator according to claim 1, characterized in that said actuator is coupled to each of said slidable first and fourth half-sheaves with said actuator including a piston connected to each of said slidable first and fourth half-sheaves and a cylinder for each piston which provide respective variable-volume chambers connected to a pressurized-oil circuitry having a common accumulator.

5. Speed variator according to claim 1, characterized in that a selected one of said axially slidable first and fourth half-sheaves engage resilient means preloaded by a clevis which is bound for the axial movements to the other of said axially slidable first and fourth half-sheaves.

* * * * *